May 25, 1954  E. D. DEAN  2,679,312
COUNTING DEVICE
Filed Oct. 13, 1947  2 Sheets-Sheet 1

INVENTOR.
Elliott D. Dean
BY
Pearson + Pearson
ATTORNEYS

May 25, 1954     E. D. DEAN     2,679,312
COUNTING DEVICE
Filed Oct. 13, 1947     2 Sheets—Sheet 2
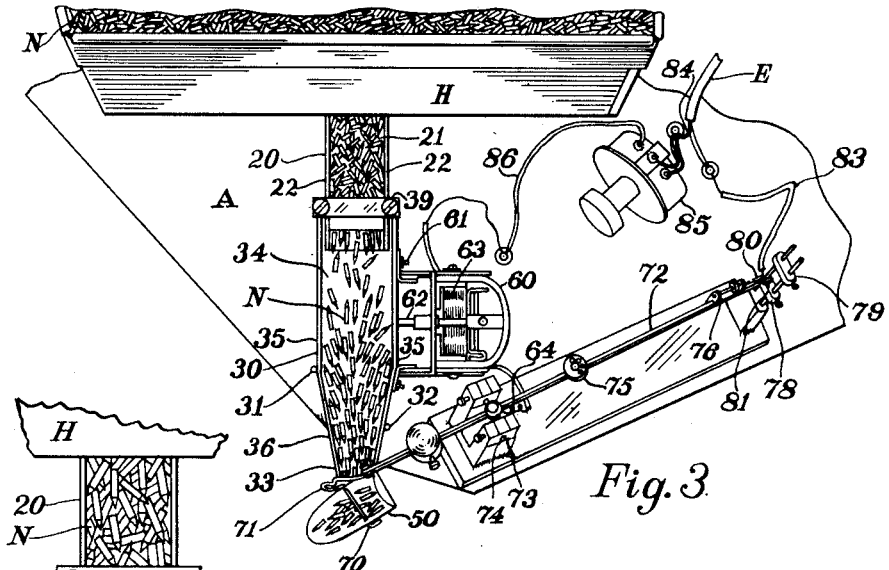
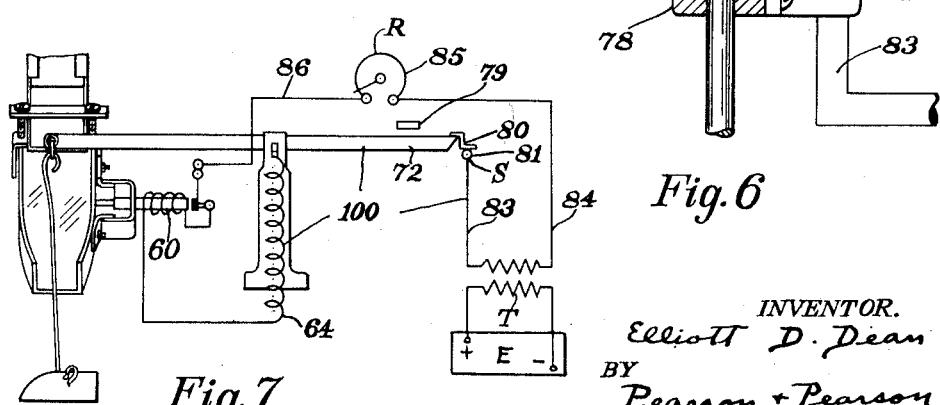
INVENTOR.
Elliott D. Dean
BY
Pearson + Pearson
ATTORNEYS Patented May 25, 1954

2,679,312

UNITED STATES PATENT OFFICE 2,679,312

COUNTING DEVICE

Elliott D. Dean, Putnam, Conn., assignor, by mesne assignments, to The Putnam Needle Company, a corporation of Connecticut Application October 13, 1947, Serial No. 779,572

5 Claims. (Cl. 198—33)

This invention relates to a packaging machine for substantially cylindrical articles having a pointed end, such as phonograph needles, and particularly for automatic machinery for filling a package with a definite number of such articles.

In the art of packaging it is customary to provide a hopper for the material to be packaged and to provide a trough leading from the hopper and delivering into a bucket carried by weighing mechanism. When the bucket has been filled to the desired weight, it is usually discharged into an empty package and returns to its former position for a similar cycle of operation.

The usual material to be packaged as above is of a granular or powdered nature and the troughs used have generally been on a horizontal plane. The troughs are often carried on parallel arms so pivoted that an electromagnetic vibrator can cause the trough to reciprocate axially while maintaining its horizontal position.

It is well known that a horizontal trough vibrated axially which receives a mass of granulated or acicular material from a hopper tends to move it along the trough as a mass although it may form in front of the mass a gradually levelled out layer of gradually decreasing height. At the delivery end of the trough if the material is granular, the forward rows of material fall off in a thin, wide stream into the weighing bucket.

However, with material of an acicular nature, each article has substantial length and weight and when a thin wide stream of the same is dropped off the end of a trough, it prevents delicate and accurate weighing.

By the term acicular, I mean needle shaped articles of substantially uniform cross section which taper to one pointed end. I include within this term cylindrical phonograph needles and such needles having a flattened portion for example those of the "Petmecky" type, well known in the trade.

I have discovered that an inclined trough is preferable for acicular articles and can be used in a device for weighing a definite number of cylindrical needles if a substantial portion of the trough at and near the delivery end is inclined only a slight degree from the horizontal. I prefer to use two troughs of approximately equal length, the trough adjacent to the hopper being at a sharper angle than the second trough adjacent to the bucket. I may however use one trough having two angles of inclination the essential feature being the decreased inclination adjacent to the delivery end.

An inclined trough such as described in the preceding paragraph, if arranged to reciprocate axially and if reciprocated in an axial direction by a vibrator, as in prior devices, may cause the whole mass of needle shaped articles to slide downward and into the weighing bucket. This is undesirable because toward the end of the operation of filling the bucket it is necessary to have the flow limited to one or two articles at a time.

I therefore fix my inclined trough at each end to permit imperceptible transverse vibration but not to permit any perceptible reciprocation, either transversely or axially at the delivery end thereof. Instead of tapping the trough in an axial direction, I affix my electro-magnetic vibrator so that the trough is tapped repeatedly in a transverse direction. Furthermore, I have discovered that when the vibrator is applied at or near the delivery end of the trough, the mass of needle shaped articles remains substantially stationary while the forward upper articles, peel off one by one and progress down the trough in a single layer each article gradually assuming a position parallel to the direction of travel.

With my improved vibrating trough, the cylindrical needle shaped articles tend to align themselves first in a herringbone fashion and, as they approach the delivery end, tend to assume a position parallel to the axis of the trough. The sides of my inclined trough are preferably tapered down to a small mouth, slightly wider than the length of one such article. This also tends to force the needle shaped articles into alignment parallel with the axis of the trough.

At the mouth of the trough, the articles, instead of arriving in wide rows or in jumbled juxtaposition, are delivered in overlapping relation to each other, one slightly behind the other. Therefore, only one article at a time commences the fall into my weighing bucket, as its centre of gravity passes the tip of the trough, and a delicate flow control is thus possible.

My weighing mechanism is so arranged that, after the bucket is tilted, emptied into a package, and returned to its normal position, an electric circuit to the vibrator is closed and rapid transverse vibration of the trough commences.

I provide a contact arm comprising a strip of resilient metal associated with the scale beam carrying the bucket for making and breaking the electric circuit of my device.

In operation, the vibration of the trough rapidly fills the bucket until the counterweight on the scale beam is overbalanced at which point my resilient contact arm separates from its contact point and breaks the circuit.

However the slight momentum of the needle shaped articles in falling from the tip of the trough so rapidly, together with the weight of the articles themselves, causes the bucket to over balance the counterweight only temporarily. When the effect of the momentum of the articles is absorbed, the scale beam therefore swings back to its original position, closing the contact arm momentarily, and permitting the electro-magnetic vibrator to again tap the trough.

Several more needles may fall from the trough into the bucket at this time which again causes the contact arm to open the circuit. This same cycle may be repeated several times until the final taps by the vibrator are of such short duration that only one article at a time may fall into the bucket. The exact count is reached when the bucket actually overbalances the counterweight by the weight of articles alone, and the bucket is then tilted into an empty package, manually, by an operator.

I use different counterweights for different sizes and amounts of such cylindrical pointed articles and my electric circuit includes a rheostat for controlling the operation of the circuit. I may also include a manually operated gate in the trough to control the flow of articles from the hopper into the trough.

In the drawings,

Fig. 3 is a plan view.

Fig. 4 is an enlarged detailed plan view of the delivery end of the trough and its contents.

Fig. 5 is a side view of a modified form of trough.

Fig. 6 is an enlarged fragmentary front view of the scale beam contact arm of my device, and Fig. 7 is a circuit diagram of my device.

Figure 1:
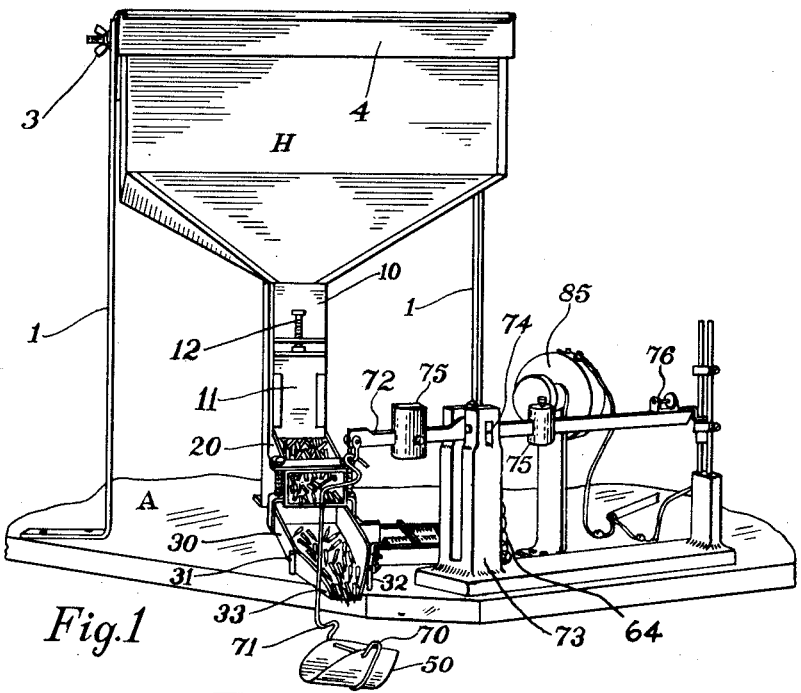
Fig. 1 is a front perspective view of my device.

As shown, A is a suitable platform over which a hopper H is supported, preferably by three upright members 1 arranged to permit vertical adjustment of the hopper by means of holes 2 and set screws 3. I may provide a band 4, supported by uprights 1, and in turn supporting the bead 5 around the top of hopper H, whereby the hopper is permitted to vibrate slightly within the holding band 4.

Cylindrical pointed articles, such as phonograph needles N, when placed in hopper H, flow by gravity down the conduit 10, which may be of any suitable length, into an inclined trough 20 integral with conduit 10. I provide a vertically slidable gate 11, adjustable by any well known means such as set screw 12, to control the flow of articles from vertical conduit 10 into the inclined trough portion 20.

Figure 2:
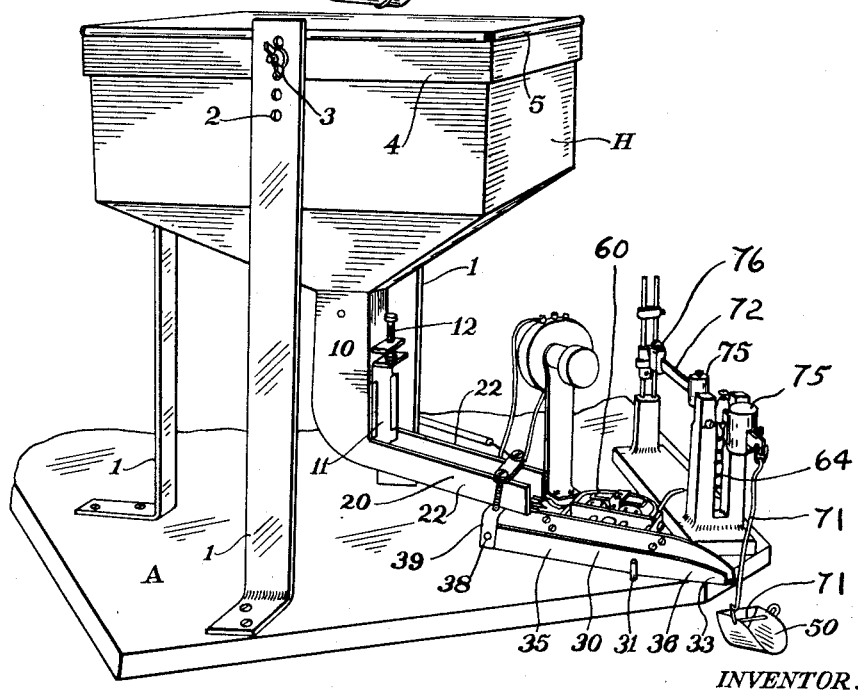
Fig. 2 is a side perspective view.

In my preferred construction, shown in Figures 1–3, I provide a second trough 30 into which trough 20 feeds and which feeds into a weighing bucket 50. The forward or delivery end 33 of trough 30 projects over the edge of platform A and rests on the platform between two upright posts 31 and 32.

Trough 20 has a bottom 21 and parallel side walls 22, 22 while trough 30 has a bottom 34 and sidewalls 35, 35, which taper to the comparatively narrow mouth 33 at the delivery end. The tapered portions 36, 36 of sidewalls 35 tend to guide any needle shaped articles, such as N, which may be progressing down trough 30 with their axis substantially perpendicular to the trough into a position in which they are each parallel to the trough.

Trough 30 is hinge pivoted at 38 to a member 39 fixed to trough 20 by any suitable means so that positioning of the hopper H by set screw 3, moves conduit 10 and trough 20 and permits trough 30 to assume a greater or less angle of inclination, in a vertical plane, as desired.

An electro-magnetic vibrator or other automatic vibrating mechanism 60 is fixed to a side wall 35 of trough 30 by fastening means such as bolts 61. Vibrator 60 is of a type well known in the art and preferably consists of a plunger 62 and magnetic coils 63 which, upon the application of electric current, causes the plunger 62 to repeatedly tap side wall 35.

I prefer to apply the vibrating plunger 62 to the side wall 35 in the location shown in the drawings because I have found that the best results are so obtained. It should be noted that troughs 20 and 30 are supported between hopper H and the posts 31, 32 and the vibration of trough 30 is transmitted to trough 20, conduit 10 and hopper H through member 39. No appreciable transverse movement of the hoppers or troughs occurs with this construction although the articles in trough 30 are caused to vibrate the greatest amount, the articles in trough 20 considerably less and the articles in the hopper H least of the three.

Articles N may travel down the more sharply inclined trough 20 in a somewhat jumbled mass but upon dropping into trough 30 the mass becomes substantially stationary because of the less inclination of trough 30. The impulses from the vibrator are strong at this point and cause the upper articles of the mass to slide forward off the pile and, together with some of the lower forward articles, to travel forward toward the delivery end in single layer of overlapping articles.

The article delivery means of the invention thus includes the conduit 10, leading downwardly from, and fixed to, hopper H, the comparatively sharply inclined trough 20 leading from, and integral with, conduit 10 and the only slightly inclined trough 30 leading from, and supported at, its rearward receiving end by trough 20 while its forward delivery end 33 rests on platform A, between posts 31 and 32. Posts 31 and 32 form non yielding means or positioning means, located on each opposite side of trough 30, proximate the delivery end thereof, for restraining the trough against any perceptible sidewise movement. The hopper H, conduit 10 and sharply inclined trough 20 all form a yielding means for supporting the article receiving end of trough 30 with a limited sidewise yielding movement which may be slightly perceptible. The pivot 38, between trough 30 and trough 20 is not a loose connection. It is a tight connection which permits hinge pivoting only in a vertical plane. It is not intended to permit relative sidewise movement between troughs 30 and 20, but only relative angular movement in a vertical plane when hopper H is either raised or lowered.

My weighing mechanism consists of the weighing bucket 50, tiltable on an arm 70 of a member 71 fixed to one end of a scale beam 72. Scale beam 72 is supported by uprights 73 to which it is pivoted at 74 and carries suitable weights and counterweights 75 and delicate adjusting mechanism 76 to balance the bucket and its contents.

As shown in Fig. 6, I provide members 78 and 79 above and below the weighted side of the scale beam to limit the travel thereof and provide a resilient strip of metal 80 carried by the beam 72 and which I call the contact arm of a switch S.

Switch S includes contact point 81 so positioned that when the tiltable bucket 59 is empty or only partially filled the contact arm 80 touches 81 and closes the electrical circuit 100 of my device.

E is any convenient source of electro-motive force for electric circuit 100 in which electromagnetic vibrator 60 and switch S are included.

As shown in Fig. 7, when contact arm 80 touches contact point 81 a circuit 100 is made through wire 83, transformer T, wire 84, rheostat 85, wire 86, vibrator 60, coiled wire 64, scale beam 72 and switch S.

When switch S is open, it is obvious that the vibrator will not operate and I control the rapidity or vibration by means of rheostat R. The resilient construction of contact arm 80 permits it to remain in contact with 81 until the counterweight is definitely overbalanced by the needle weight thus avoiding fluttering and thereby speeding the weighing process.

Figure 4 is illustrative of the path of the articles N in my device showing in dotted and full lines the position assumed by the articles when the trough is tapped.

In Fig. 5 I show a modification of my device in which the trough 110 is of one piece and is bent at 111 so that the angle of inclination is sharper near the hopper at 112 than at the delivery end 113.

I claim:

1. As an article of manufacture a device for separating a mass of acicular articles received from a hopper into a single layer of articles all substantially parallel to each other and each slidably advancing with its end foremost said device comprising the combination of an elongated, trough having its bottom inclined downwardly from its article receiving portion, at a slight degree from the horizontal and having integral, oppositely disposed side walls upturned from said bottom; an electro magnetic vibrator attached to a side wall of said trough, adapted to rapidly and repeatedly tap said side wall in a direction perpendicular thereto; non yielding means, positioned on each opposite side of said trough, proximate said vibrator, for restraining the same against side wise movement and yielding means, positioned in advance of the location of said vibrator on said trough arranged to support the receiving portion thereof with a limited sidewise yielding movement.

2. Apparatus for automatically separating a mass of acicular articles into a single layer of articles all substantially parallel to each other and each slidably advancing end foremost, said apparatus comprising a hopper for receiving a mass of said articles; article delivery means fixed at its receiving end to the bottom of said hopper and resting at its delivery end on an horizontal surface; a trough forming the lower end of said article delivery means, having upstanding side walls integral with the bottom thereof and having its bottom inclined downwardly toward its delivery end at a slight degree from the horizontal; an electro magnetic vibrator attached to a side wall of said trough arranged to rapidly and repeatedly tap said side wall in a sidewise direction; supporting means for said hopper arranged to limit sidewise movement thereof to a slightly perceptible amount and positioning means for the delivery end of said trough arranged to limit sidewise movement thereof to an imperceptible amount.

3. Apparatus as specified in claim 2 wherein said article delivery means includes a vertical conduit and an integral sharply inclined trough intermediate of said means, the delivery end thereof pivotally supporting the receiving end of the trough which forms the delivery end of said article delivery means.

4. Apparatus as specified in claim 2 wherein the supporting means for said hopper includes an horizontally extending bead around said hopper, a loosely fitting band around said hopper, under said bead, and a plurality of uprights supporting said band above said surface.

5. Apparatus as specified in claim 3 wherein the positioning means for the delivery end of said trough comprises a pair of posts, each in close contact with an opposite side of said trough.

References Cited in the file of this patent

UNITED STATES PATENTS

| Number | Name | Date |
|---|---|---|
| 474,777 | Keith | May 10, 1882 |
| 791,243 | Carlson | May 30, 1905 |
| 857,164 | Edtbauer | June 18, 1907 |
| 1,203,286 | Webber | Oct. 31, 1916 |
| 1,263,638 | Bausman | Apr. 23, 1918 |
| 2,333,435 | Muskat | Nov. 2, 1943 |
| 2,352,114 | Muskat | June 20, 1944 |
| 2,361,111 | Light | Oct. 24, 1944 |
| 2,466,936 | Dowie | Oct. 13, 1947 |
| 2,549,322 | McKinsey | Apr. 17, 1951 |

FOREIGN PATENTS

| Number | Country | Date |
|---|---|---|
| 362,702 | Great Britain | Dec. 10, 1931 |